United States Patent
Yang et al.

(10) Patent No.: US 7,264,171 B2
(45) Date of Patent: Sep. 4, 2007

(54) ELECTRONIC DEVICE WITH EMBEDDED IMAGE CAPTURE MODULE

(75) Inventors: Chun-Fei Yang, Taipei (TW); Kuo-Yang Cheng, Taipei (TW); Chih-Sheng Chou, Taipei (TW); Chi-Chun Chiang, Taipei (TW)

(73) Assignee: Wistron Corp., Taipei Hsien (TW)

( * ) Notice: Subject to any disclaimer, the term of this patent is extended or adjusted under 35 U.S.C. 154(b) by 292 days.

(21) Appl. No.: 10/998,019

(22) Filed: Nov. 26, 2004

(65) Prior Publication Data

US 2005/0263600 A1    Dec. 1, 2005

(30) Foreign Application Priority Data

May 31, 2004    (TW) ................. 93115488 A

(51) Int. Cl.
    *G06K 7/10*    (2006.01)
(52) U.S. Cl. ............. 235/472.01; 235/462.11; 235/462.24; 455/556.1
(58) Field of Classification Search ........ 235/472.01, 235/462.24, 462.11; 455/556.1
    See application file for complete search history.

(56) References Cited

U.S. PATENT DOCUMENTS

| 2004/0097262 A1* | 5/2004 | Lee ................. 455/556.1 |
| 2005/0007489 A1* | 1/2005 | Ahn et al. ........... 348/375 |
| 2005/0024500 A1* | 2/2005 | Katayama ......... 348/207.99 |
| 2006/0128429 A1* | 6/2006 | Cha ................. 455/556.1 |

OTHER PUBLICATIONS http://en.wikipedia.org/wiki/Injection_moulding, printed on Nov. 3, 2006 from the Internet.*

* cited by examiner

*Primary Examiner*—Steven S. Paik
(74) *Attorney, Agent, or Firm*—Quintero Law Office

(57) ABSTRACT

An electronic device with image capture module. The electronic device comprises a display module, an image capture module, a resilient member and a rotating member. The display module comprises a seat with a through hole. The image capture module is rotatably connected to the seat with a shaft inserted the hole. The resilient member has recesses and is fixed on the shaft. When the image capture module rotates with respect to the main body, the resilient member interferes with the recesses of the rotating member, positioning at any angle and creating a positive interval response.

8 Claims, 8 Drawing Sheets

ELECTRONIC DEVICE WITH EMBEDDED IMAGE CAPTURE MODULE

BACKGROUND

The present invention relates to an electronic device, and in particular to an electronic device with a rotatable embedded image capture module.

Presently, embedded cameras in conventional personal digital assistants (PDAs) or mobile phones are disposed on the opposite side of displays.

FIG. 1 shows a conventional PDA with an embedded camera. When taking photos, the camera 14 of the PDA 10 must be focused on the subject, which is presented on the flat display 12. The image presented on the flat display 12, however, cannot be seen by a user attempting to take a self-portrait. Thus, the portrait is typically unsatisfactory. Hence, embedded cameras 14 may be considered inconvenient when attempting to take a self-portrait.

SUMMARY

Accordingly, embodiments of the invention provide an electronic device with a rotatable embedded image capture module to increase operational flexibility.

Embodiments of the invention provide a rotatable structure for an embedded image capture module to position at any angle, create a positive interval response and increase operational stability.

Embodiments of the invention provide an electronic device with an image capture module. The housing of the electronic device comprises a resilient member. The image capture module is rotatably disposed on the electronic device and comprises a shell with recesses. When the image capture module rotates with respect to the main body of the electronic device, the resilient member interferes with the recesses, positioning at any angle and creating a positive interval response. Furthermore, the shell is cylindrical, and the recesses are disposed on the outer bore.

Embodiments of the invention further provide another electronic device with an image capture module. The image capture module comprises a shaft rotatably connected to the main body of the electronic device and recesses arranged around the shaft.

Embodiments of the invention further provide another electronic device comprising a seat, an image capture module, and a resilient member. The seat comprises a through hole and recesses arranged around the through hole. The image capture module comprises a shaft and is rotatably connected to the seat with the shaft inserted into the through hole. The resilient member is disposed on the shaft between the seat and the image capture module and comprises protrusions interfering with the recesses when the image capture module rotates with respect to the main body. The resilient member is formed by sheet metal forming or injection molding.

Embodiments of the invention further provide another electronic device comprising a seat, an image capture module, and a resilient member. The seat comprises a through hole and recesses on the inner bore of the through hole. The image capture module comprises a hollow column portion with an opening and is rotatably connected to the seat with the column portion inserted into the through hole. The resilient member with a protruding portion is disposed in the column portion with the protruding portion extending out of the opening, such that the protruding portion interferes with the recesses when the image capture module rotates with respect to the electronic device. The resilient member is C-shaped.

Embodiments of the invention further provide another electronic device comprising a seat with a through hole, an image capture module with a shaft, a resilient member, and a rotating member. The image capture module is rotatably connected to the seat by inserting the shaft into the through hole. The resilient member is disposed on the seat adjacent to the through hole. The rotating member is disposed on the shaft and comprises recesses interfering with the resilient member when the image capture module rotates with respect to the electronic device. Furthermore, the recesses are disposed on the outer bore of the rotating member.

A detailed description is given in the following embodiments with reference to the accompanying drawings.

BRIEF DESCRIPTION OF THE DRAWINGS

Embodiments of the invention can be more fully understood by reading the subsequent detailed description and examples with references made to the accompanying drawings, wherein.

DETAILED DESCRIPTION

Figure 1:
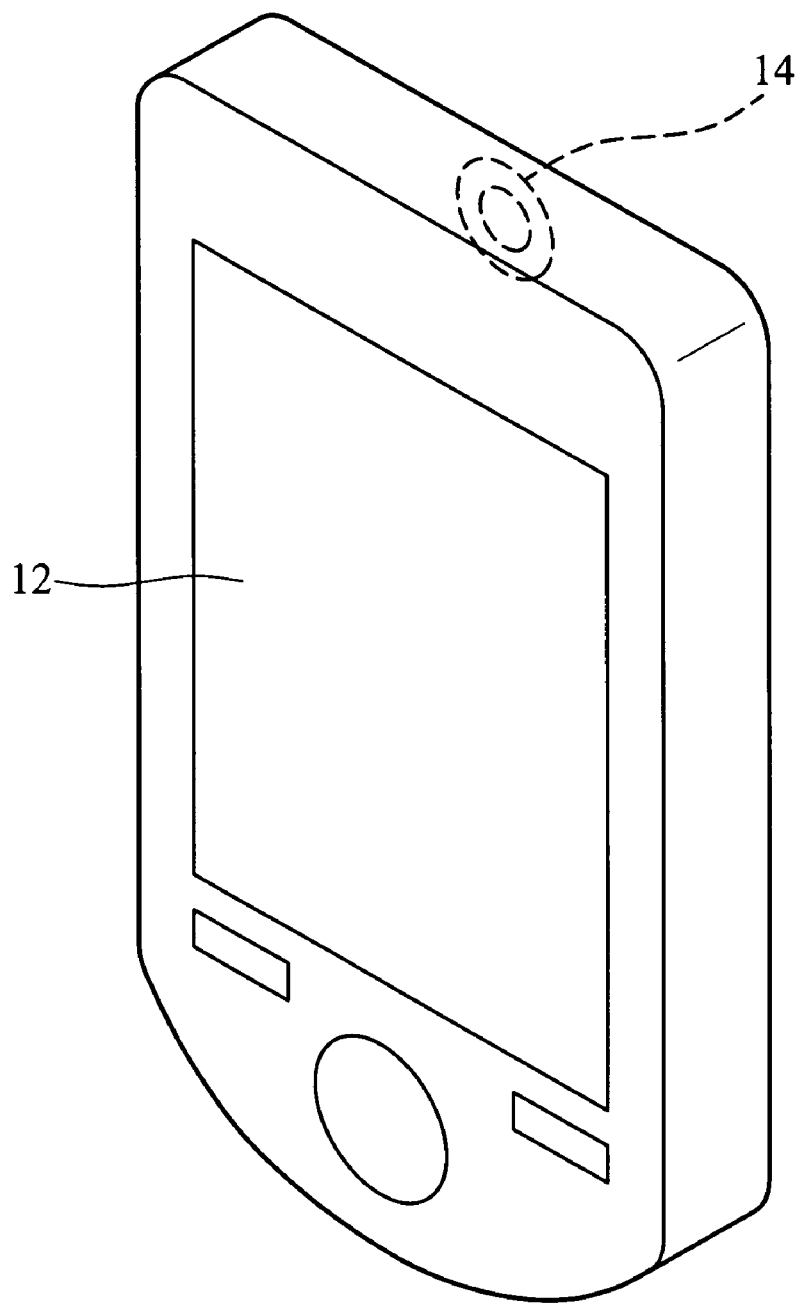
FIG. 1 is a schematic view of a conventional PDA with an embedded camera.
Figure 2B:
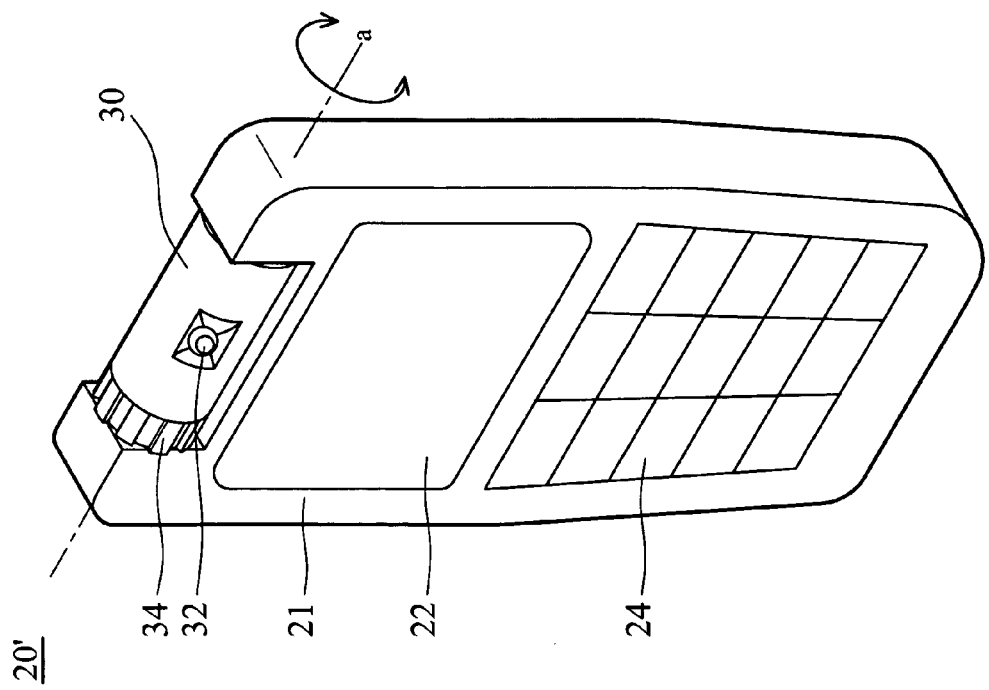
FIGS. 2A~2C shows electrical devices with rotatable image capture modules in embodiments of the invention.
Figure 2A:
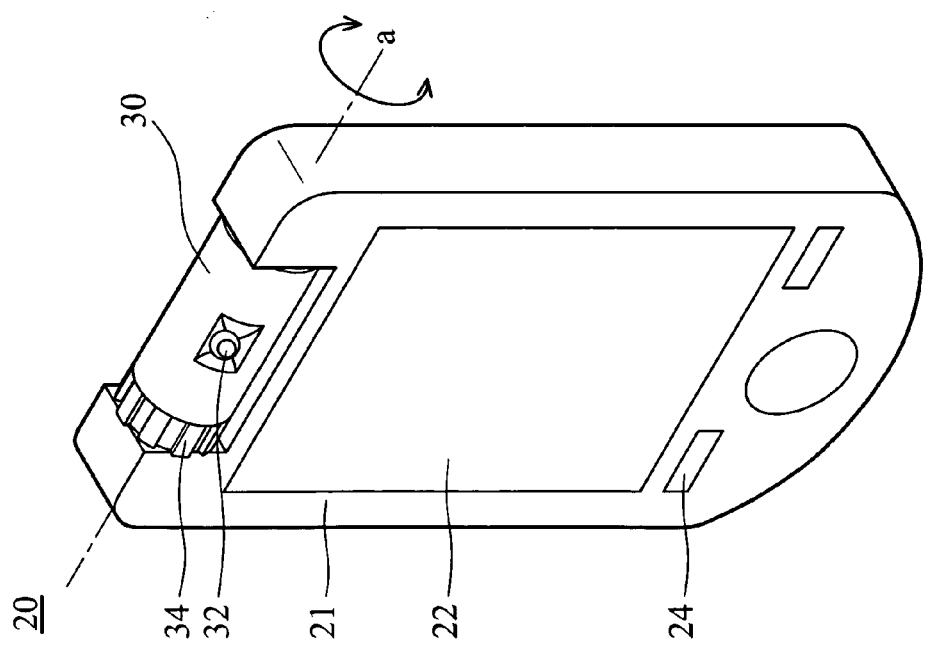
Figure 2C:
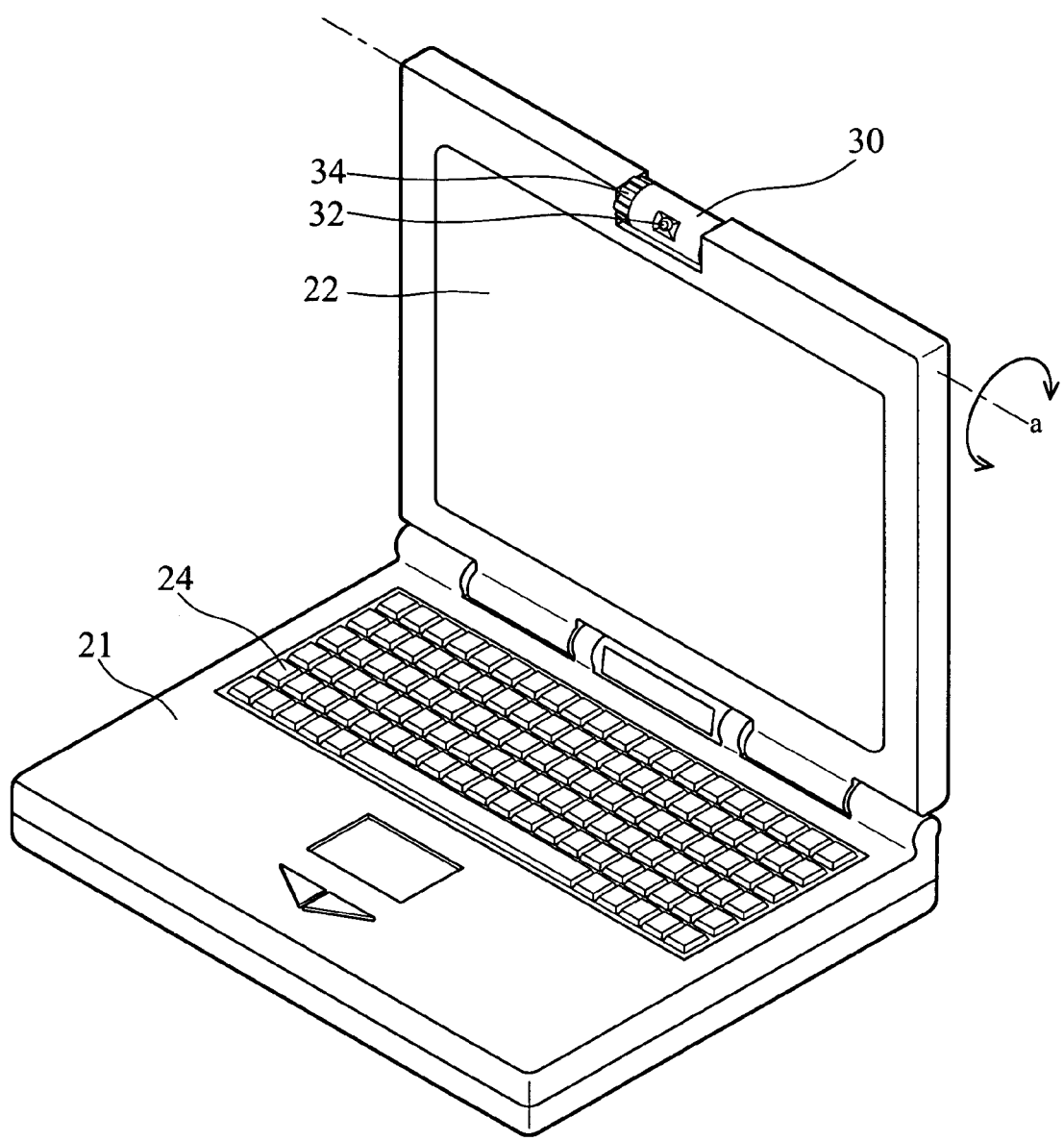

Embodiments of the invention provide an electronic device with an embedded image capture module, such as a personal digital assistant 20 in FIG. 2A, mobile phone in FIG. 2B, and notebook computer 20" in FIG. 2C. In FIGS. 2A~2C, the PDA 20, mobile phone 20', or notebook computer 20" individually comprises a display module 22 and a plurality of function keys 24. The image capture modules 30 thereon are digital cameras or digital video cameras and are rotatably disposed on the main body 21 of each device. When taking a self-portrait, the image capture module 30 can be rotated about an axis a, aligning lens 32 with and focusing on the subject, such the composition of the photo can be adjusted according to the images shown on the display module 22.

A positive interval response for the embedded rotatable image capture module 30 of the embodiments of the invention are described in the following.

FIRST EMBODIMENT

Figure 3B:
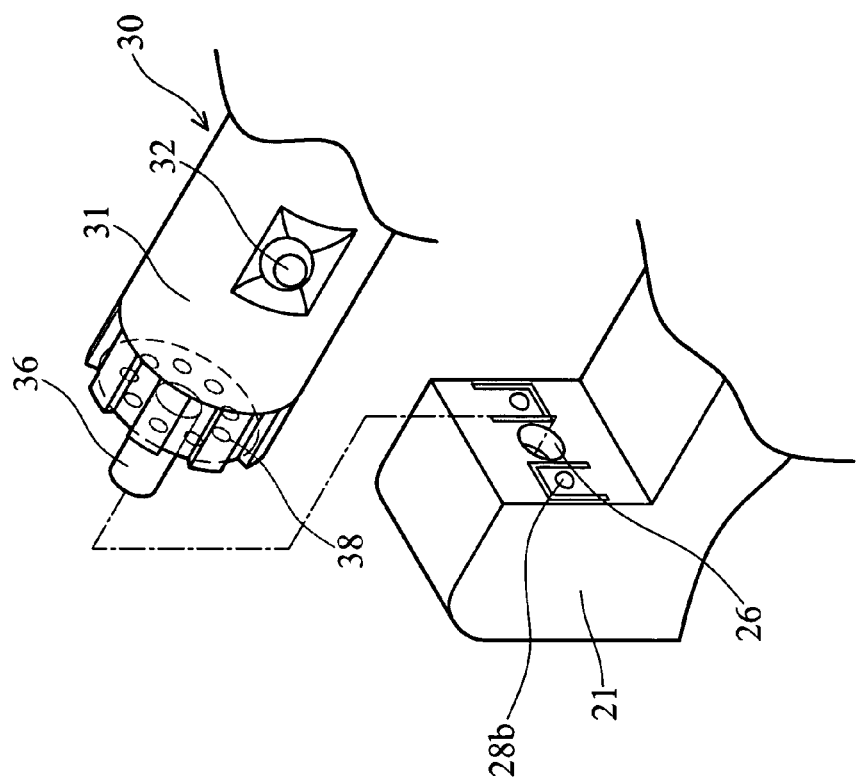
FIG. 3B shows another interfering structure of the electronic device of the first embodiment.
Figure 3A:
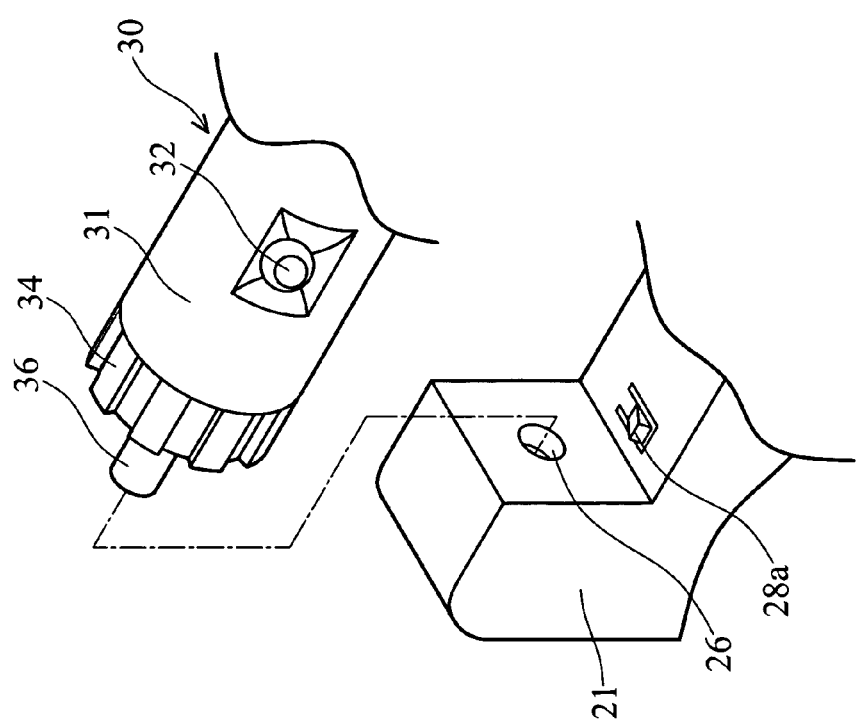
FIG. 3A is an exploded view of an electronic device with an image capture module in the first embodiment of the invention.

FIG. 3A is an exploded view of an electronic device with an embedded image capture module in the first embodiment of the invention. In FIG. 3A, the image capture module 30 is rotatably disposed on the electronic device by inserting a shaft 36 into a through hole 26 of the housing 21 of the electronic device. The image capture module 30 is cylindrical and comprises a rough area with recesses 34 on the outer bore. The housing 31 of the electronic device comprises a resilient member 28a with a protrusion corresponding to the position of the recesses 34. Therefore, when the image capture module 30 rotates with respect to the main body of the electronic device, the protrusion of the resilient member 28a interferes with the recesses 34, positioning at any angle and creating a positive interval response.

FIG. 3B shows another interfering structure of the electronic device of the first embodiment. In FIG. 3B, the housing 21 of the electronic device comprises two resilient members 28b adjacent to the through hole 26. The image capture module 30 comprises recesses 38 arranged around the shaft 36. When the image capture module 30 is rotatably disposed on the electronic device, the protrusions of the resilient members 28b interfere with the recesses 38, thus positioning at any angle and creating a positive interval response.

Furthermore, the resilient members 28a and 28b of this embodiment can be integrally formed with the housing 21 by injection molding, or can be a sheet-metal forming member engaged on the house 21 of electronic device.

SECOND EMBODIMENT

Figure 4:
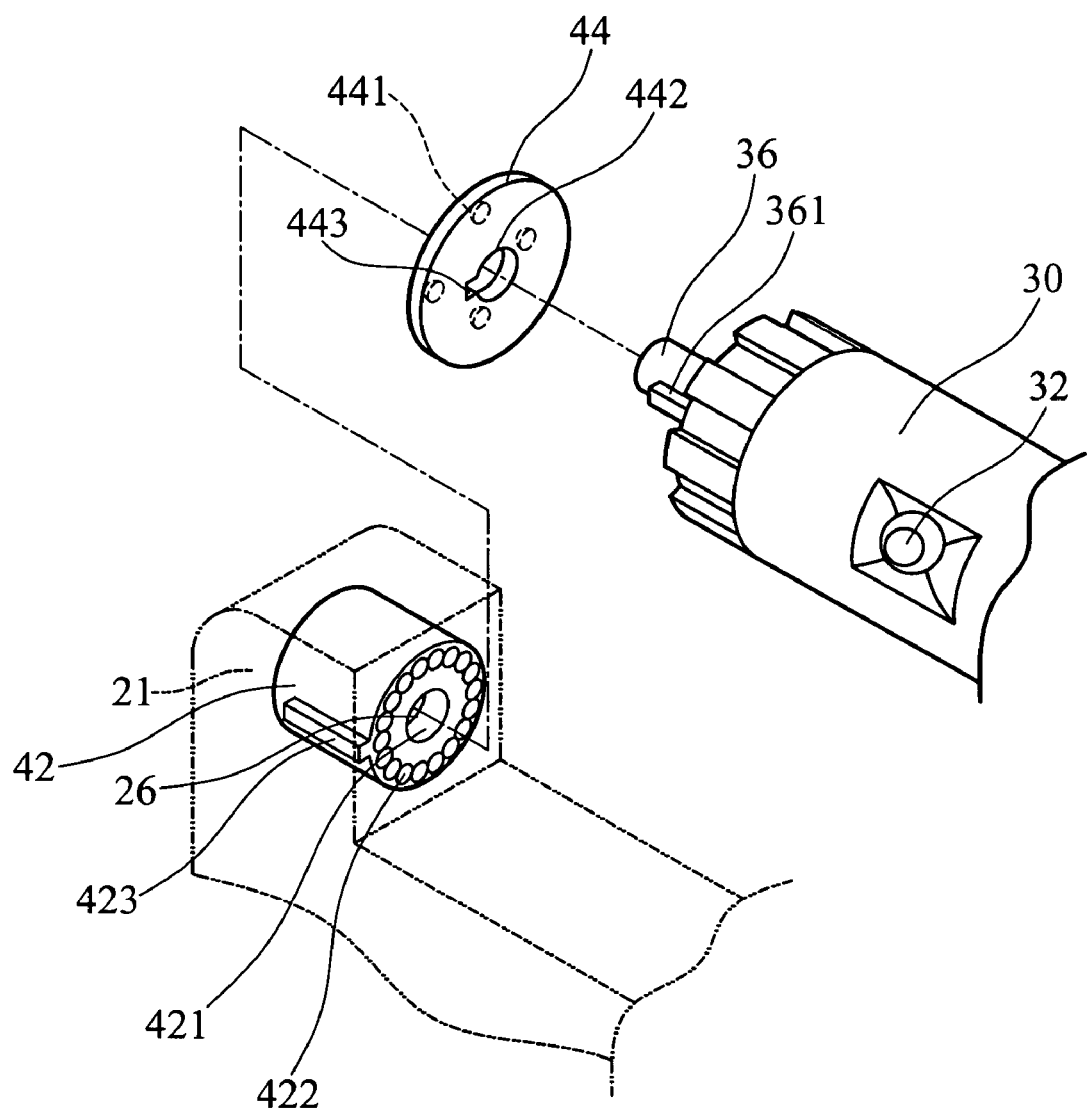
FIG. 4 is an exploded view of another electronic device with an image capture module of the second embodiment.

FIG. 4 is an exploded view of another electronic device of the second embodiment. In order to simplify the drawing, the housing 21 of the electronic device is represented by dotted lines.

In FIG. 4, the electronic device of the second embodiment comprises a seat 42, an image capture module 30, and a resilient member 44. The image capture module 30 is rotatably disposed on the electronic device by inserting a shaft 36 into a through hole 26 of the housing 21 of the electronic device and comprises a aligning lens 32. The seat 42 is substantially cylindrical and comprises finger portions 423 engaged with the housing 21 of the electronic device. The seat 42 further comprises a through hole 421 and recesses 422 arranged around the through hole 421. The image capture module 30 is rotatably connected to the seat 42 by inserting a shaft 36 into the through hole 421.

The resilient member 44 is disposed between the seat 42 and the image capture module 30. The resilient member 44 of this embodiment is formed by sheet metal forming or injection molding and comprises a central hole 442 with a notch 443. The resilient member 44 is fixed on the shaft 36 by engaging the notch 443 with a key 361 of the shaft 36 as the image capture module 30 rotates. The resilient member 44 further comprises a plurality of protrusions 441 corresponding to the intervals between the recesses 422 on the seat 42. Thus, the protrusions 441 of the resilient member 44 interfere with the recesses 422, positioning at any angle and creating a positive interval response, when the image capture module 30 rotates with respect to the electronic device.

THIRD EMBODIMENT

Figure 5A:
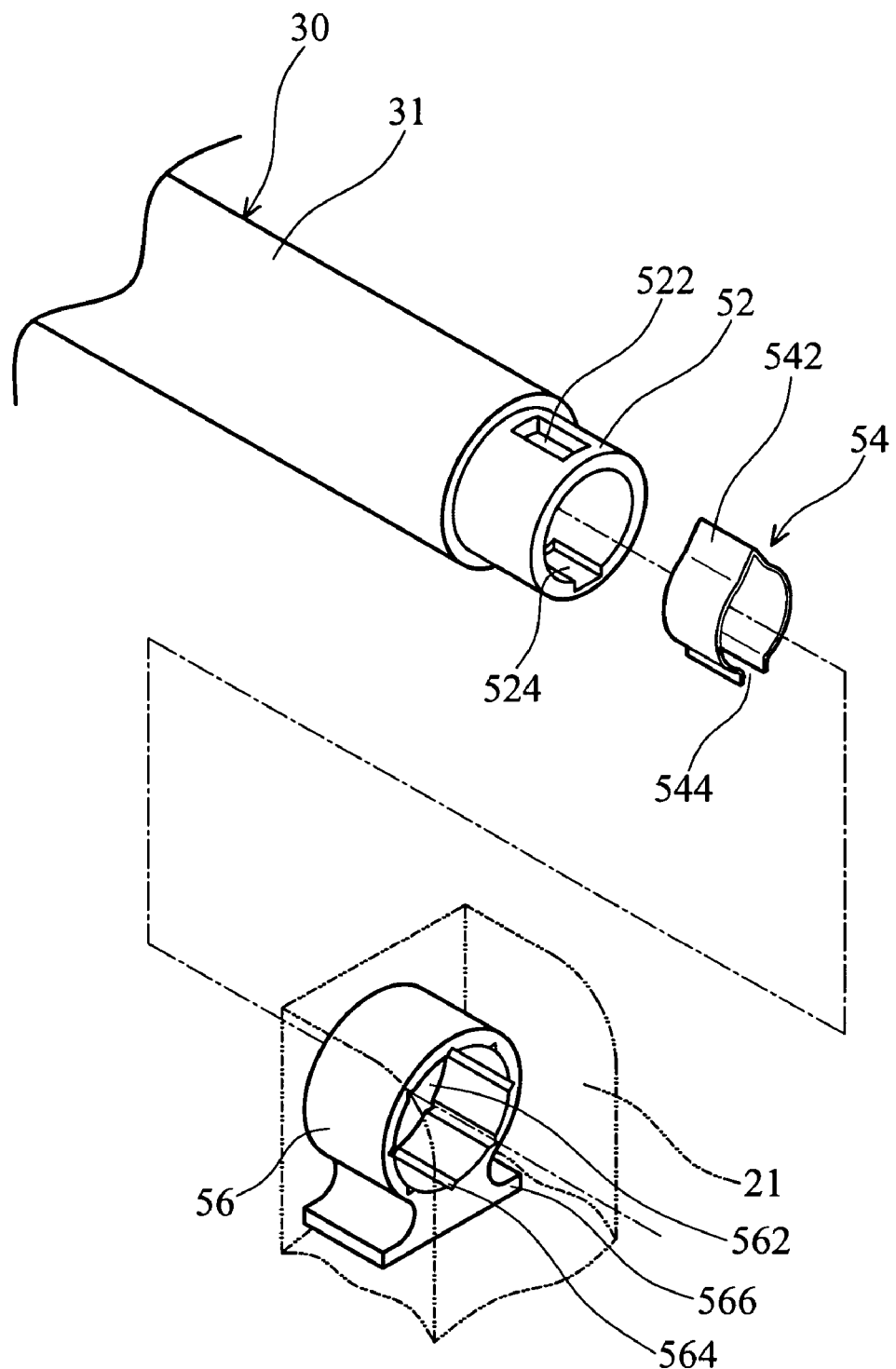
FIG. 5A is an exploded view of another electronic device with an image capture module of the third embodiment.

FIG. 5A is an exploded view of an electronic device of the third embodiment. In FIG. 5A, the electronic device comprises a seat 56, an image capture module 30, and a metallic resilient member 54. The seat 56 is disposed in the housing 21 with two finger portions 566 engaged therewith. The seat 56 further comprises a through hole 562 and a plurality of recesses 564 on the inner bore of the through hole 562. The image capture module 30 comprises a shell 31 with a hollow column portion 52. The outer bore of the column portion 52 is equal to the inner bore of the through hole 562, such that the image capture module 30 can be rotatably connected to the seat 56 with the column portion 52 inserted into the through hole 562. Thus, the image capture module 30 can rotate with respect to the electronic device.

The resilient member 54 is substantially C-shaped and disposed in the column portion 52 of the image capture module 30. The resilient member 54 comprises a protruding portion 542 at the opposite side of the gap 544. The protruding portion 542 extends out of an opening 522 on the column portion 52. The free ends of the resilient member 54 individually abut the sidewalls of groove 524.

Figure 5B:
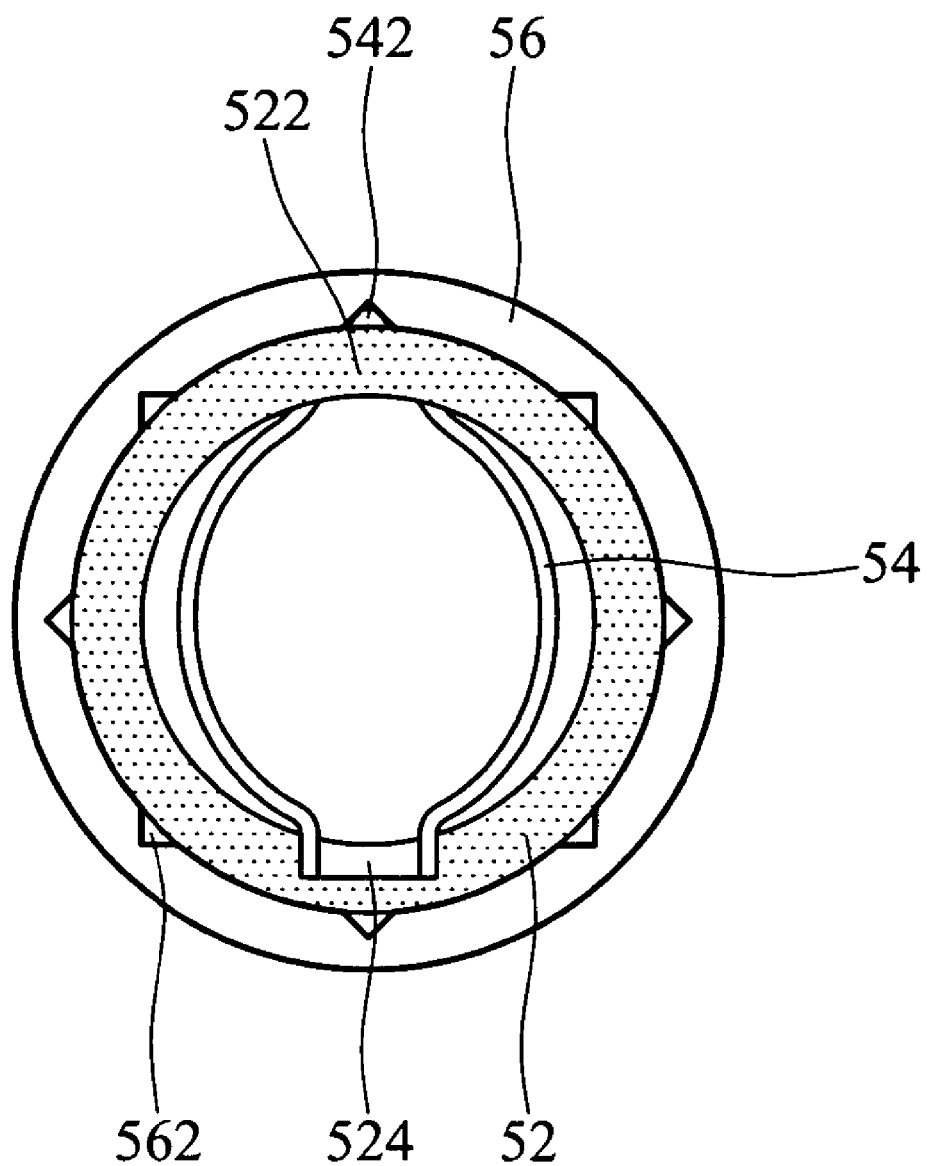
FIG. 5B is a cross section of the hollow column portion in FIG. 5A.

FIG. 5B is a cross section of the hollow column portion 52 in FIG. 5A. The protruding portion 542 extending out of the opening 522 interferes with the recesses 564 when the image capture module 30 rotates with respect to the electronic device. As the image capture module 30 rotates, the hollow protruding portion 542 deforms and recovers its original shape after arriving at the next recess 564, thus positioning at any angle and creating a positive interval response.

Furthermore, because of the hollow column portion 52 of the image capture module 30, a flat flexible cable (FFC) passing through the column portion 52 can be utilized to connect the image capture module 30 and the electronic, communicating signals therebetween.

FOURTH EMBODIMENT

Figure 6:
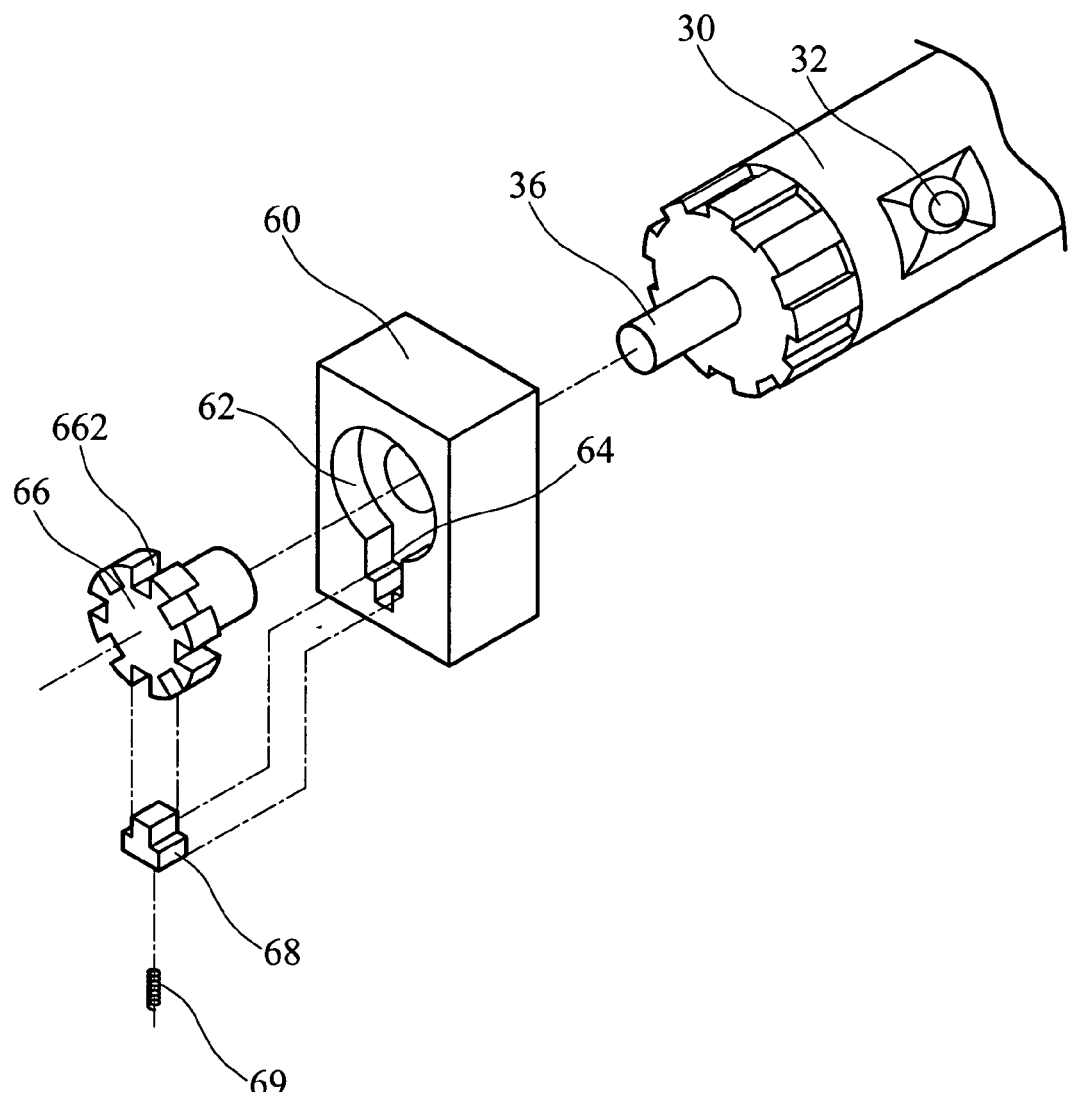
FIG. 6 is an exploded view of another electronic device with an image capture module of the fourth embodiment.

FIG. 6 is an exploded view of an electronic device of a fourth embodiment. In FIG. 6, the electronic device comprises a seat 60 with a through hole 62, an image capture module 30 with a shaft 36, a resilient member (68 and 69), and a rotating member 66. The image capture module 30 is rotatably connected to the seat 60 by inserting the shaft 36 into the through hole 62 and comprises a aligning lens 32. The seat 60 further comprises a slot 64 for receiving the resilient member.

In FIG. 6, the resilient member comprises a slider 68 and a spring 69, sequentially disposed in the slot 64 adjacent to the through hole 62. The rotating member 66 is fixed on the shaft 36 and rotates as the image capture module 30 rotates. The rotating member 66 is substantially cylindrical and comprises a plurality of recesses 662 on the outer bore thereof. Thus, the protrusion on the slider 68 interferes with the recesses 662, positioning at any angle and creating a positive interval response, when the image capture module 30 rotates with respect to the electronic device.

The rotatable structure for the image capture module in each embodiment of the invention can be employed in PDAs, mobile phones, notebook computers or other electronic devices. The rotatable structure of each embodiment provides more operational flexibility when taking a self-portrait. The rotatable structure is positioned at any angle and creates a positive interval response to increase operational stability.

While the invention has been described by way of example and in terms of the preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a main body comprising a seat with a through hole and a plurality of recesses arranged around the through hole;
   an image capture module with a shaft rotatably connected to the seat with the shaft inserted into the through hole; and
   a resilient member disposed on the shaft between the seat and the image capture module, wherein the resilient member comprises a plurality of protrusions interfering with the recesses when the image capture module rotates with respect to the main body, wherein the image capture module comprising a key, and the resilient member comprises a notch engaged with the key.

2. The electronic device as claimed in claim 1, wherein the resilient member is formed by sheet metal forming or injection molding.

3. The electronic device as claimed in claim 1, wherein the image capture module comprises a plurality rotating angle via the resilient member interferes with the recesses.

4. The electronic device as claimed in claim 3, wherein the plurality rotating angle is equal to the recesses.

5. An electronic device, comprising:
   a main body comprising a seat with a through hole;
   an image capture module with a shaft and rotatably connected to the seat with the shaft inserted into the through hole;
   a resilient member disposed on the seat, adjacent to the through hole;
   a slider movably disposed on the seat; and
   a rotating member disposed on the shaft and comprising a plurality of recesses interfering with the slider via the resilient member when the image capture module rotates with respect to the main body.

6. The electronic device as claimed in claim 5, wherein the recesses are disposed on the outer bore of rotating member.

7. The electronic device as claimed in claim 5, wherein the image capture module comprises a plurality rotating angle via the resilient member interferes with the recesses.

8. The electronic device as claimed in claim 7, wherein the plurality rotating angle is equal to the recesses.

* * * * *